Patented June 19, 1928.

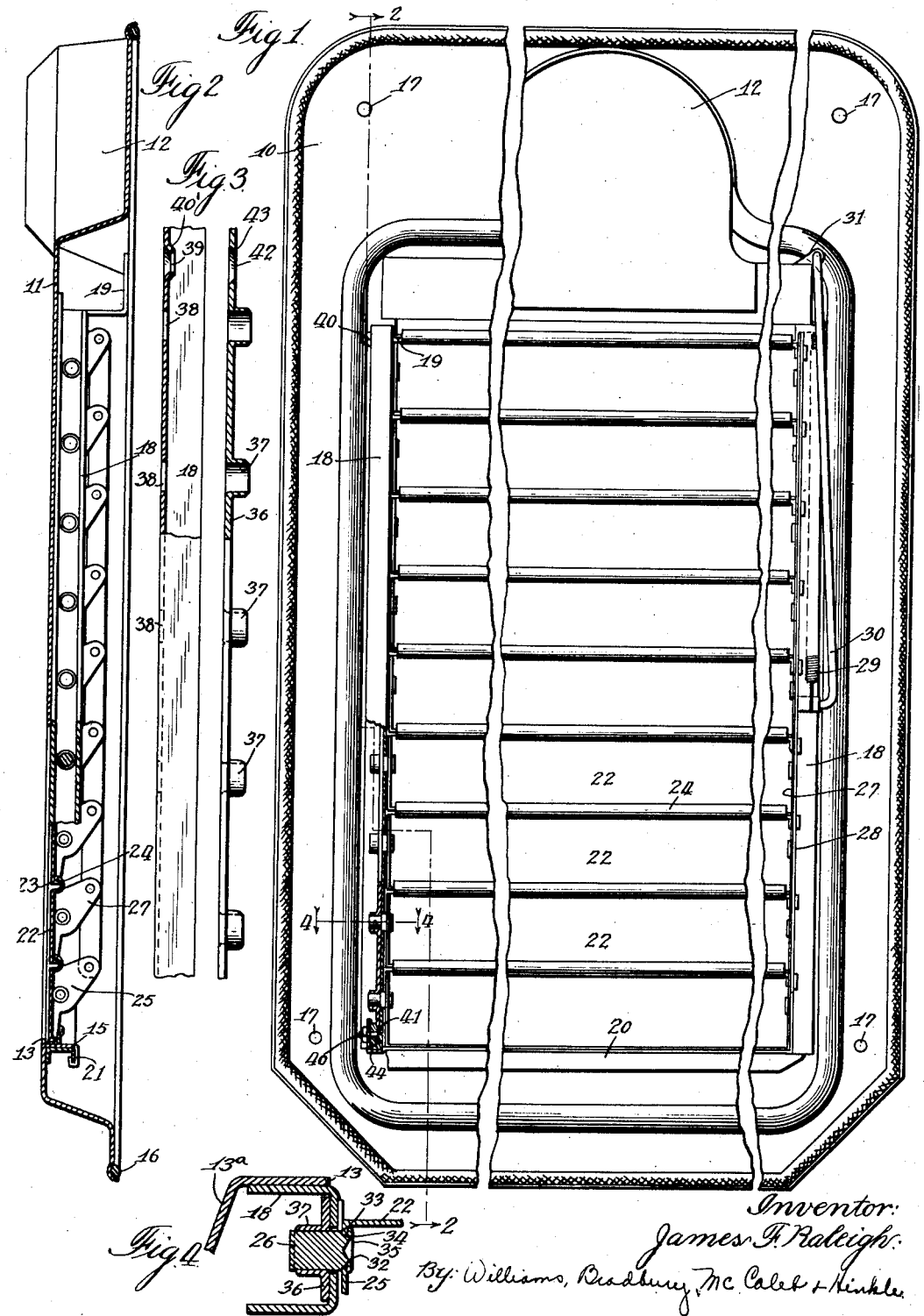

1,673,995

UNITED STATES PATENT OFFICE.

JAMES F. RALEIGH, OF RIVER FOREST, ILLINOIS, ASSIGNOR TO PINES WINTERFRONT COMPANY, OF CHICAGO, ILLINOIS, A CORPORATION OF DELAWARE.

SHUTTER APPARATUS FOR RADIATORS.

Application filed September 7, 1926. Serial No. 133,893.

My invention relates to a shutter apparatus for use in connection with a radiator of an internal combustion engine constituting the power plant of an automotive vehicle. The improvements which are characteristic of my present invention are particularly useful when incorporated in a thermostatically operated radiator shutter attachment, but are by no means restricted to use in an attachment of this specific type.

One of the principal objects of my present invention is to provide a plurality of radiator shutters with bearings which are noiseless and dust-proof, which are adequately protected by the frame members by which they are supported, which operate with a minimum of friction, and which may be economically manufactured and assembled with the shutters and shutter frames and which require practically no attention after the shutter apparatus is installed upon an automobile radiator.

The shutter apparatus herein shown is of the type comprising two principal frames, namely, the shell or main frame and a sub-frame which is secured in the shell or main frame and which supports the shutters and, if desired, a part or all of the shutter operating mechanism.

In the accompanying drawings illustrating my invention,

Figure 1 is a rear elevational view of a radiator shutter attachment embodying my invention, certain parts of the apparatus being broken away to show in cross section my novel shutter bearing strip in assembly with other improved structure.

Figure 2 is a vertical sectional view which may be regarded as taken on the line 2—2 of Figure 1 looking in the direction indicated by the arrows.

Figure 3 is an enlarged vertical elevation of my shutter bearing strip and the corresponding supporting channel in disassembled relation partially broken away to show the vertical cross section of these elements.

Figure 4 is a fragmentary sectional view which may be regarded as taken on the line 4—4 of Figure 1 looking in the direction indicated by the arrows.

Similar characters of reference refer to similar parts throughout the several views.

The shutter attachment herein shown and described may be regarded as an improvement upon the shutter apparatus described and claimed in my prior Patents, No. 1,458,593, dated June 12, 1923, and No. 1,540,280, dated June 2, 1925. Certain parts of the apparatus illustrated in the accompanying drawings are, or may be, substantially identical to corresponding parts illustrated in my aforesaid patent. Therefore, I shall not burden this specification with a detailed description of parts which are adequately illustrated and described in my prior patents, but shall confine the description to the essential parts of my improvements and such other parts as necessarily co-operate therewith.

The shutter attachment illustrated in the accompanying drawings comprises a shell or main frame consisting of a single piece of sheet metal conformed to provide a marginal flange 10, a forwardly dished central portion 11, and a thermostat housing 12. The forwardly dished central portion of the shell is provided with a rectangular fenestration 13, the shell metal at the upper and lower margins of this fenestration being turned rearwardly to provide flanges 15 which serve to stiffen the central portion of the shell and support the shutter frame as described in my prior patents.

The shutter frame and parts carried thereby are so designed as to be insertable in the attachment shell as a unit. The shutter frame is rectangular in shape and comprises side channel members 18—18, the upper channel member 19 and the lower channel member 20. The side channel members 18—18 are reversely arranged with their open sides facing away from the shutters hereinafter described. The upper channel member 19 is preferably considerably larger in size than the lower channel and has side flanges of unequal height. The upper and lower channel members are provided at their extremities with lug portions which are turned into the adjacent ends of the side channel members 18—18 and are there rigidly secured by means of bolts 40, as illustrated in Figure 1. The side channel members 18 are disposed with their closed sides or webs just without the margins of the fenestration in the main shell and across the fenestration are disposed a plurality of vertically aligned shutters 22 mounted about vertically spaced horizontal axes along the side frames 18.

The lower edge of each shutter is provided with a backwardly turned flange 23, while the upper edge of each shutter is provided with a trough-shaped flange 24 into which the flange 23 of the shutter thereabove enters when the shutters are in their normal or closed position, whereby the shutters form a substantially air-tight closure for the fenestration.

Each shutter is provided with inwardly turned ends 25 in the mid portions of which are secured aligned cylindrical studs or trunnions 26 for journaling the shutter in the side channel members 18—18.

At one side of the shutter (the right in Figure 1), the ends 25 are extended into arms 27 for pivotal connection with a link bar 28 for simultaneously actuating all of the shutters. A tension spring 29 normally urges the link bar 28 upwardly, while a rod 30 reciprocated through a valve crank 31 by thermostatic means contained in the housing 12 is adapted to push the link bar 28 downwardly to open the shutters against the force of the spring 29. This thermostatic means is not here shown as it forms no part of my present improvement.

The studs of trunnions 26, may be stamped or spun, but I prefer to turn these studs from standard round steel stock in proper lengths, first turning down a small portion of each end to form the reduced section 32, with the shoulder 33, then cutting off said studs to the length desired. The reduced section 32 of the studs 26 are then inserted in the apertures 34 of the shutter ends 25 and peened or riveted over to secure them to the shutter. In order to facilitate this peening operation, the studs 26 may be previously turned or drilled slightly hollow at the end 35, or the riveting may be done without this operation.

The studs or trunnions 26 being formed of standard stock with a minimum of machining or other operations, may be manufactured very economically and they constitute a sturdy yet flexible trunnion when mounted in the arms 25 which operates with a minimum of friction.

The bearing strips 36, shown in detail in Figure 3, and which constitute one of the most important elements of my present invention, are stamped out of fine steel plate and contain a plurality of stamped bearings 37 of tubular shape, adapted when in assembled relation to provide bearing supports for all the trunnions 26 of the shutters 22 on each side, but two bearing strips being required for a complete shutter assembly.

The bearings 37 are preferably stamped out simultaneously in a single strip, and the bearing strips 36 are provided with holes 42 at each end, said holes being larger than the frame bolts 40 and countersunk as shown at 43 both for a purpose hereinafter described. The bearing strips 36 are of such width that they nest easily within the channel 18 as shown in Figures 1 and 4, the holes 38 of the channel member aligning with the bearings 37. As the channel frame members 18 are arranged with their open sides outward from the fenestration and as the bearing strips 36 are contained in said channels, the channel frame members are drilled with holes 38 regularly spaced to receive the trunnions 26 and to align with the bearings 37 of the bearing strip when in assembled relation.

In order to make the said bearings 37 and the holes 38 self aligning and to permit easy assembly, I provide the channels 18 with the holes 39 at each end, stamped to a countersunk formation outside the channel, and with a conversely protruding portion 40' inside the channel, of the cross section of the frustrum of a hollow cone. The protrusion or lip 40' is adapted to be received in the complementary countersunk hole 42 of the bearing strip 36 when the bearing strip is placed in the said channel in such manner as to make the bearings 37 and the holes 38 self-aligning, and the assembled channel frame and bearing strip are secured to the upper and lower frame members by the same bolts at the bottom and top respectively, the bolts 40 as shown at the bottom of Figure 1, passing through both channel strip and a spacer 41 and a turned up portion 44 of the lower channel member. The bearing and frame structure thus constructed has a minimum of parts, is economically manufactured and provides accurately aligned bearings for the shutter trunnions which operate with a minimum of friction. The bearings may likewise be made dust-proof by the use of a U-shaped enclosing member, as described in my prior patents previously referred to, or they may be used in combination with any of the features and construction of said prior patents.

While I have shown this particular embodiment of my invention, it is to be understood that certain changes may be made therein without departing from the scope or spirit of my invention.

What I claim as new and desire to secure by Letters Patent of the United States, is:

1. In an automobile radiator shutter, the combination of supporting means, a plurality of shutters mounted in said supporting means, trunnions secured to the ends of said shutters, and an integral strip having a plurality of bearings stamped therein for said trunnions.

2. In an automobile radiator shutter, the combination of a channelled supporting means having a plurality of holes, steel bearing members having a plurality of bearings stamped therein, supported in said channels, a plurality of shutters pivoted in said bearings and means for aligning said bearings and holes.

3. In an automobile radiator shutter, an improved frame structure comprising a channelled frame member having a plurality of holes therein, a bearing strip having a plurality of tubular bearings and means for aligning said bearings and holes comprising complementary abutments in said channel and strip respectively.

4. In an automobile radiator shutter, the combination of a sheet metal frame having a central dished portion of substantially rectangular shape and a substantially rectangular aperture in said dished portion, with a pair of integral metal bearing strips extending along the opposite sides of said aperture and having a plurality of bearings formed therein for journalling a plurality of shutters, a plurality of shutters having pivotal posts projecting from their ends, said posts being pivotally supported by said integral bearing strips and a connecting link connecting a plurality of said shutters to operate them simultaneously.

In witness whereof, I hereunto subscribe my name this 2nd day of September, 1926.

JAMES F. RALEIGH.